Patented Sept. 16, 1924.

1,508,785

UNITED STATES PATENT OFFICE.

FRANK P. GIANNANDREA, OF ROSEBANK, NEW YORK.

VEGETABLE HAIR TONIC.

No Drawing.    Application filed June 7, 1921.   Serial No. 475,763.

*To all whom it may concern:*

Be it known that I, FRANK P. GIANNANDREA, a citizen of the United States, residing at Rosebank, Staten Island, State of New York, have invented a certain new Vegetable Hair Tonic, of which the following is a specification.

My invention relates to improvements in a formula for hair tonic and is due to the fact that I believe I have discovered that where hair has grown on the human head the bulb never dies, but that it does not have sufficient vigor to force its way through the arrector pili muscle, and that when proper nutriment is supplied to the bulb, it will cause the folicle to force its way upward through the said muscle past the sebaceous gland, and will cause the shaft to protrude above the skin.

I have discovered that by applying the mixture hereinafter set forth that it furnishes the required nutriment to the bulb to produce this result, and I have demonstrated by actual practice that by the use of the following tonic, hair can be caused to grow vigorously on the spots which have been bald for many years.

My invention consists of the following ingredients compounded in the proportions and manner hereinafter described:

To make one gallon of tonic I use one ounce of leaves from any kind of the family Theaceæ, two ounces of cinnamon bark, and three ounces of grain from *Avena sativa*, (common oats) seventy ounces of water, which is boiled and the foregoing ingredients added while it is boiling. It is then cooled and strained and 51 ounces of pure grain alcohol and one ounce of a purely vegetable perfume is added.

I am aware that these ingredients are not new separately in pharmaceutical compositions, but I am not aware that they have ever been brought together for the purpose and in the manner which I have employed them and I have demonstrated by actual practice that this tonic will have the effect above described of invigorating the bulb so as to cause the spike to protrude from the scalp and the hair to grow on spots which have been bald for many years.

Having described my invention what I regard as new and desire to secure by Letters Patent is:

1. A hair tonic comprising an aqueous extract of tea, cinnamon bark and oats, with an additional ingredient of alcohol in sufficient quantity to operate as a preservative.

2. A hair tonic comprising an extract composed of approximately two ounces of cinnamon bark, three ounces of oats, seventy ounces of water, the same being mixed as the water is being boiled, and approximately fifty-one ounces of pure grain alcohol to be added when the mixture is cooled.

In testimony whereof, I have signed the foregoing specification.

FRANK P. GIANNANDREA.